United States Patent
Zhang et al.

[11] Patent Number: 6,037,986
[45] Date of Patent: Mar. 14, 2000

[54] VIDEO PREPROCESSING METHOD AND APPARATUS WITH SELECTIVE FILTERING BASED ON MOTION DETECTION

[75] Inventors: Ji Zhang, San Jose, Calif.; Cedric Gouliardon, Paris, France

[73] Assignee: DiviCom Inc., Malpitas, Calif.

[21] Appl. No.: 08/683,546

[22] Filed: Jul. 16, 1996

[51] Int. Cl.[7] ............................................. H04N 7/18
[52] U.S. Cl. ..................... 348/409; 348/411; 348/413; 348/415; 348/416; 348/699
[58] Field of Search ............................... 348/409, 405, 348/411, 410, 413, 415, 416, 420, 421, 422, 451, 448, 699, 700, 701, 384, 385

[56] References Cited

U.S. PATENT DOCUMENTS

| | | | |
|---|---|---|---|
| 4,613,894 | 9/1986 | Catros et al. | 348/416 |
| 4,853,775 | 8/1989 | Rouvrais et al. | 348/699 |
| 5,384,865 | 1/1995 | Loveridge | 382/54 |
| 5,483,288 | 1/1996 | Hong | 348/448 |
| 5,561,477 | 10/1996 | Polit | 348/700 |
| 5,691,775 | 11/1997 | Astle | 348/416 |

*Primary Examiner*—Andy Rao
*Attorney, Agent, or Firm*—Proskauer Rose LLP

[57] ABSTRACT

Video preprocessing methods and apparatus which utilize motion detection to control selective filtering of pels in a sequence of video frames wherein a video preprocessor generates first and second motion metrics for a given pel in a current frame N by taking the difference between the given pel and corresponding pels in a previous frame N–1 and a subsequent frame N+1, respectively. The motion metrics are converted to first and second bitmaps by thresholding the motion metric value against a first threshold. A motion detection metric is then generated for a given pel by summing the values of the first and second bitmaps for a group of pels which includes the given pel, and comparing the result to a predetermined threshold. The group of pels may include five pels on each of two lines above the given pel, and five pels on each of two lines below a given pel. The motion detection metric may be used to determine whether or not temporal median filtering and/or temporal lowpass filtering operations should be applied to the given pel. The motion detection metric may also be used in conjunction with an edge detection metric and a frame-wise motion activity measure to generate an address into a look-up table. The look-up table specifies a set of filter coefficients for use in a spatial lowpass filtering operation applied to the given pel.

37 Claims, 4 Drawing Sheets

VIDEO PREPROCESSING METHOD AND APPARATUS WITH SELECTIVE FILTERING BASED ON MOTION DETECTION

FIELD OF THE INVENTION

The invention relates generally to video preprocessing techniques which involve detecting motion in video frames, and more particularly to preprocessing techniques which generate motion detection metrics suitable for use in the selective filtering of video frames to improve coded video quality.

BACKGROUND OF THE INVENTION

Motion video signals typically contain a significant amount of intraframe or spatial redundancy as well as interframe or temporal redundancy. Video compression techniques take advantage of this spatial and temporal redundancy to significantly reduce the amount of data bandwidth required to process, transmit and store video signals. MPEG-2 is a well-known video compression standard developed by the International Standards Organization (ISO) Moving Picture Experts Group (MPEG) and documented in "Information Technology Generic Coding of Moving Pictures and Associated Audio Information: Video," ISO/IEC DIS 13818-2 (Video), which is incorporated herein by reference. MPEG-2 video compression involves both spatial and temporal compression of video frames or fields.

An exemplary MPEG-2 video encoder receives a sequence of video frames or fields from a video source such as a video camera or a telecine machine. The sequence of frames may be progressive or interlaced. A progressive sequence may have a frame rate of 30 frames per second. An interlaced sequence generally includes two fields for each frame, with a top field corresponding to even numbered lines and a bottom field corresponding to odd numbered lines. An interlaced sequence at a frame rate of 30 frames per second will therefore have a field rate of 60 fields per second. The frames in the video sequence may be converted to SIF or CCIR-601 resolution images made up of a plurality of adjacent macroblocks, with each macroblock including, for example, four 8×8 blocks of luminance pixels and two 8×8 blocks of chrominance pixels.

Spatial compression is applied to each of the macroblocks using the techniques of transform encoding, quantization, scanning, run-amplitude encoding and variable length coding. Transform encoding involves applying a discrete cosine transform (DCT) to each 8×8 block of pixels in a given macroblock to thereby generate an 8×8 block of DCT coefficients. The DCT coefficients are then quantized by dividing each coefficient by a quantizer step size which is the product of a weighting matrix element and a quantization scale factor selected for the given macroblock. The human eye is generally more sensitive to the lower frequency coefficients than the higher frequency coefficients. As such, the quantization step size is varied depending on the frequency of the coefficient that is quantized so that the low frequency coefficients can be mapped to a larger selection of values than the high frequency coefficients. The resulting quantized coefficients are scanned using a zig-zag scanning process which tends to aggregate zero-amplitude quantized coefficients. The resulting sequence can then be divided into subsequences each including a run of zero quantized coefficients followed by a single non-zero quantized coefficient. The subsequences are then run-amplitude encoded to produce a pair of numbers corresponding to the number of zero coefficients in the run and the amplitude of the single non-zero coefficient following the run. The run-amplitude pairs thus formed are then variable length encoded using a predetermined table which assigns a codeword to each anticipated run-amplitude pair.

Temporal compression is applied to a given macroblock using the techniques of motion estimation and motion compensation. The macroblock to be encoded is also referred to as a target macroblock or simply a target block, while the frame or field containing the target block is referred to as a target frame or target field, respectively. The motion estimation process makes use of a search window in the reference frame. The search window generally specifies the portion of the reference frame which will be searched in order to locate a macroblock which best matches a given target macroblock. A block matching algorithm is used to identify the reference frame macroblock within the specified search window which best matches the target macroblock. The identified reference frame macroblock is referred to as a predictive macroblock. A motion vector is then generated to indicate a translation between the pixel coordinates of the predictive macroblock and the target macroblock. Motion compensation involves generating a prediction error macroblock as the difference between the predictive macroblock and the target macroblock. The prediction error macroblock may then be spatially encoded as described above. The motion vector may be variable length encoded and outputted with the spatially encoded prediction error macroblock. For bidirectionally-predictive (B) frames, a bidirectionally-predictive macroblock is generated by interpolating between a predictive macroblock from a previous reference frame and a predictive macroblock from a subsequent reference frame. Two motion vectors are generated to indicate translations between the pixel coordinates of the previous and subsequent predictive macroblocks and the target macroblock. A prediction error macroblock is generated as the difference between the bidirectionally predictive macroblock and the target macroblock. The prediction error macroblock and motion vectors are then encoded as in the general case previously described.

Video preprocessing techniques are applied prior to performing the MPEG-2 spatial and temporal compression operations described above. An exemplary video preprocessor processes the video signal so that it may be more efficiently compressed by subsequent video compression circuitry. For example, the preprocessor may alter the format of each frame in terms of the number of horizontal or vertical pixels in order to meet parameters specified by the video compression circuitry. In addition, a preprocessor can detect scene changes or other image variations which increase compression difficulty. A scene change generally increases the amount of bits required because predictive encoding cannot initially be used. If the preprocessor detects a scene change, this information may be communicated by the preprocessor to the video compression circuitry. A fade, representing a continuous decrease or increase in luminance level to or from black over several frames, can also cause difficulties for the video compression circuitry because it can cause a failure in motion compensated prediction. The preprocessor can detect and inform the video compression circuitry of a fade so that the compression circuitry can take appropriate precautions.

Conventional video preprocessing techniques have generally been concerned with detecting and correcting obvious problematic situations such as the above-noted format alterations, scene changes and fades. However, these conventional preprocessing techniques have not addressed the possibility of preprocessing a video signal to optimize the quality of a displayed signal after compression and decompression. For example, it has not been heretofore suggested that a preprocessing technique which results in some actual degradation of signal quality prior to compression may in fact produce a higher quality displayed signal after compression and decompression. Conventional preprocessing also fails to provide efficient techniques for selectively filtering portions of a given video image, and for performing motion detection, edge detection and other image analysis operations on interlaced video images.

As is apparent from the above, a need exists for improved video preprocessing techniques which can be performed prior to compression but which optimize the quality of a displayed video signal after compression and decompression. The techniques should provide simple and effective selective filtering of video images, as well as improved motion detection, edge detection and other image analysis operations.

SUMMARY OF THE INVENTION

The present invention provides methods and apparatus for preprocessing a video signal prior to compression. The preprocessing of the present invention is designed to optimize the quality of a displayed image after compression and decompression operations, and is particularly well-suited for use in conjunction with MPEG-2 video applications.

One aspect of the invention involves the generation of a motion detection metric which may be used to control filter selection in video preprocessing applications. The motion detection metric may also be used for other purposes in numerous other motion detection applications. First and second motion metrics are generated for a given pel in a current frame N by taking the difference between the given pel and corresponding pels in a previous frame N−1 and a subsequent frame N+1, respectively. The motion metrics are converted to first and second bitmaps by thresholding the motion metric value against a first threshold. A motion detection metric is then generated for a given pel by summing the values of the first and second bitmaps for a group of pels which includes the given pel, and comparing the result to a predetermined threshold. The group of pels may include five pels on each of two lines above the given pel, and five pels on each of two lines below a given pel. This aspect of the invention provides an improved motion detection metric which is more robust to noisy pels than conventional motion detection metrics.

In accordance with another aspect of the present invention, a video preprocessor generates the above-described motion detection metric or a conventional motion detection metric for a given pel, and uses the generated motion detection metric to determine whether or not a temporal median filtering operation and/or a temporal lowpass filtering operation will be performed on the given pel. An exemplary embodiment of the invention includes both a 3-tap temporal median filter and a 2-tap temporal lowpass filter which receive the motion detection metric as a control signal. These temporal filters are controlled by the motion detection metric such that the filtering operations are performed on the given pel if the motion detection metric indicates a lack of motion for the given pel.

In accordance with another aspect of the invention, a video preprocessor generates the above-described motion detection metric or a conventional motion detection metric for a given pel, and uses the generated motion detection metric along with other pre-compression and/or post-compression statistics to select one of a plurality of sets of filter coefficients to be used in a spatial lowpass filtering operation performed on the given pel. The other pre-compression statistics which may be utilized in conjunction with the motion detection metric include an edge detection metric and a frame-wise motion activity measure. Post-compression statistics such as frame coding activity measures may also be used in the spatial lowpass filter selection process. In an exemplary embodiment, pre-compression statistics such as the motion detection metric, edge detection metric and frame-wise activity measure are used to generate an address into a look-up table. The look-up table includes entries for a variety of different combinations of these pre-compression statistics, and each entry specifies one of sixteen possible sets of vertical lowpass filter coefficients. A particular one of sixteen possible spatial lowpass filters can thus be selected for a given pel by supplying the statistics generated for that pel as inputs to the look-up table. In other embodiments, horizontal filtering could be used in place of or in conjunction with the above-noted vertical lowpass filtering. For example, an embodiment utilizing both horizontal and vertical filtering in accordance with the invention could provide particularly effective two-dimensional filtering.

DETAILED DESCRIPTION OF THE PREFERRED EMBODIMENTS

The present invention will be illustrated below in conjunction with an exemplary MPEG-2 video compression application. It should be understood, however, that the invention is more broadly applicable to video compression based on other compression standards, as well as to numerous alternative motion detection applications. In addition, although the embodiments disclosed herein will be described as processing a CCIR-601 encoded video signal for either NTSC or PAL frames, other frame resolutions and formats could also be used.

Figure 1:
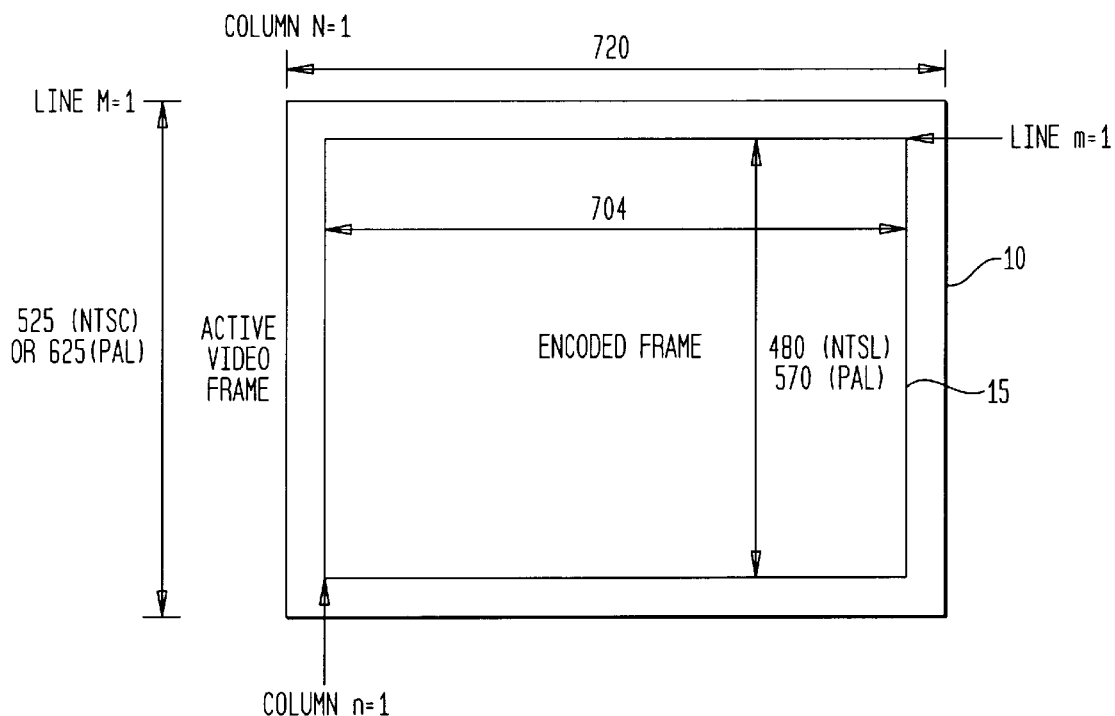
FIG. 1 illustrates the relative dimensions of active and CCIR-601 encoded video frames for both NTSC and PAL frame formats.

FIG. 1 illustrates the relative dimensions of typical active and CCIR-601 encoded frames for both NTSC and PAL frame formats. As shown in TABLE 1 below, the active video frame 10 has a pel area of 720×525 pels in the NTSC format and 720×625 pels in the PAL format. The CCIR-601 encoded video frame 15 has a pel area of 704×480 pels in the NTSC format and 704×570 pels in the PAL format.

TABLE 1

| Video Format | NTSC | PAL |
| --- | --- | --- |
| Horizontal (line) number | m | m |
| Vertical (column) number | n | n |
| First encoded line | m = 1 | m = 1 |
| Last encoded line | $m_{max}$ = 480 | $m_{max}$ = 576 |
| First encoded column | n = 1 | n = 1 |
| Last encoded column | $n_{max}$ = 704 | $n_{max}$ = 704 |
| First active line | M = 1 | M = 1 |
| Last active line | $M_{max}$ = 525 | $M_{max}$ = 625 |
| First active column | N = 1 | N = 1 |
| Last active column | $N_{max}$ = 720 | $N_{max}$ = 720 |

Figure 2:
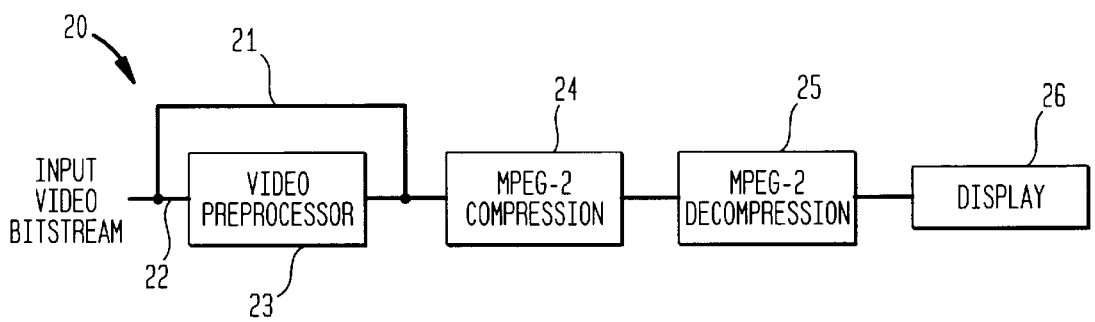
FIG. 2 is a block diagram of a video processing system for preprocessing, compressing, decompressing and displaying a video signal in accordance with the present invention.

FIG. 2 shows a video processing system 20 which includes a video preprocessor 23, an MPEG-2 compression circuit 24, an MPEG-2 decompression circuit 25 and a display unit 26. A portion of an input video bitstream is applied to an input of the video preprocessor 23 via line 22. In this exemplary embodiment, the portion of the input video bitstream applied to preprocessor 23 includes only the luma pels. The chroma pels in the input video bitstream are separated from the luma pels and applied directly to the MPEG-2 compression circuit 24 via line 21. In alternative embodiments, other portions of the input bitstream, including the entire input bitstream, could be applied to and processed in the preprocessor 23. The output of the preprocessor 23 is applied to the MPEG-2 compression circuit 24 via line 21. The compression circuit applies spatial and temporal compression techniques to the preprocessed luma pels and the unpreprocessed chroma pels to thereby generate a compressed video signal which may be transmitted, stored or otherwise processed. In the video processing system 20, the compressed video signal is applied to the MPEG-2 decompression circuit 25. The decompressed video signal from decompression circuit 25 is applied to the display unit 26. It should be recognized that the system 20 will generally include additional elements between the compression circuit 24 and the decompression circuit 25, such as transmission media, transport stream encoders/decoders, multiplexers/demultiplexers, modulators/demodulators and/or storage devices.

As noted above, conventional video preprocessors generally do not alter a video signal to be compressed in a manner which designed to result in improved video quality when the signal is subsequently decompressed and viewed on the display unit 26. A preprocessor in accordance with the invention provides improved performance in part by recognizing that appropriate adjustment of a video signal to be compressed can result in better video quality after decompression and display. This has been found to be true even in situations in which the preprocessing adjustment results in some degradation in video signal quality before compression. Any such degradation is generally more than offset by the substantial increase in video quality after decompression.

Figure 3:
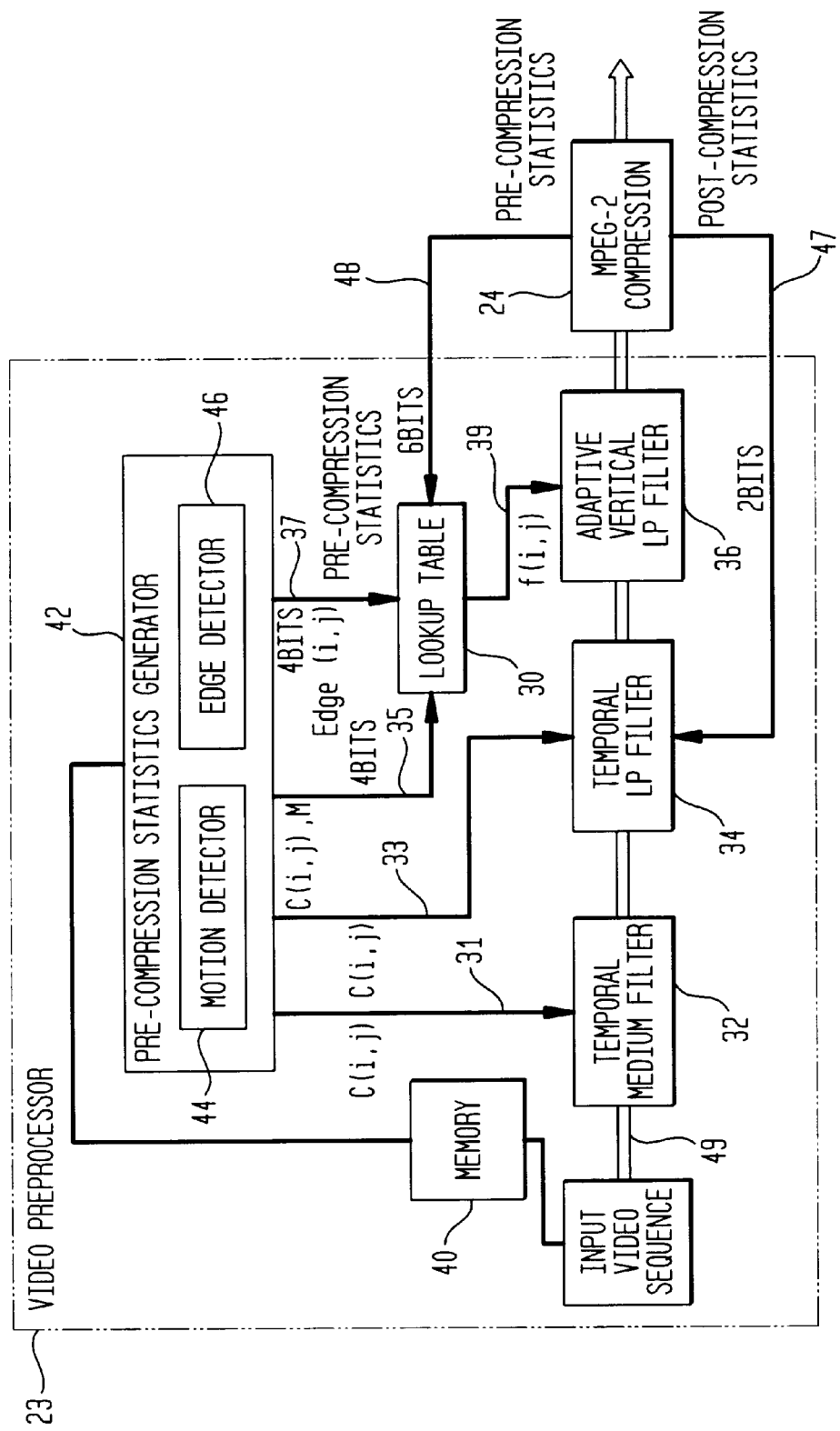
FIG. 3 is a more detailed block diagram of a video preprocessor and compression circuit in accordance with the invention and suitable for use in the video processing system of FIG. 2.

FIG. 3 shows a more detailed view of the video preprocessor 23 and its interconnection with compression circuit 24. The preprocessor 23 in this exemplary embodiment includes a memory 40, a pre-compression statistics generator 42 having a motion detector 44 and an edge detector 46, and a look-up table 30. The preprocessor also includes a temporal median filter 32, a temporal lowpass filter 34 and an adaptive vertical lowpass filter 36. Although FIG. 3 illustrates the elements of preprocessor 23 as separate blocks, it should be noted that these blocks may represent software-based processes operating with common hardware on a single processor, application-specific integrated circuit (ASIC) or computer. The input of MPEG-2 compression circuit 24 is coupled to the output of adaptive vertical lowpass filter 36 in preprocessor 23. The compression circuit has a first post-compression statistics output coupled via line 47 to a control input of the temporal lowpass filter 34, and a second post-compression statistics output coupled via line 48 to the look-up table 30. As will be described in greater detail below, pre-compression statistics generator 42 generates a motion detection metric c(i,j), an edge detection metric Edge(i,j) and a motion activity measure for each of a plurality of target luma pels in a sequence of encoded video frames of the input bitstream. These pre-compression statistics are used to control the manner in which the temporal median filter 32, temporal lowpass filter 34 and adaptive vertical lowpass filter 36 filter a given luma pel.

Figure 4:
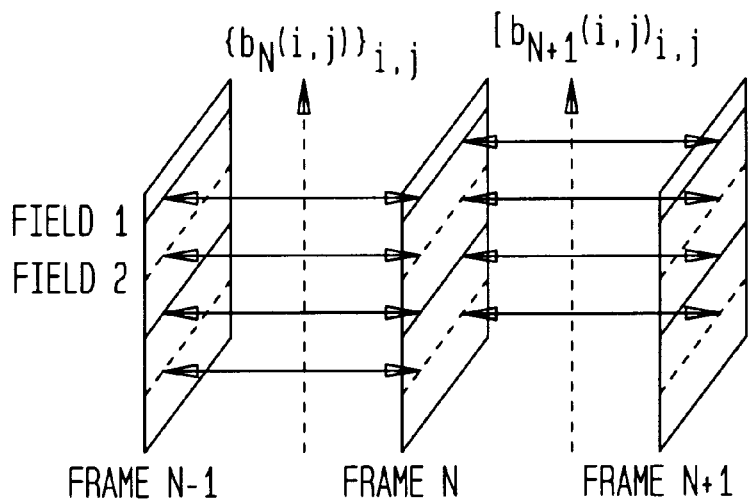
FIG. 4 illustrates adjacent previous, current and subsequent video frames which may be supplied to a motion detector in the video preprocessor of FIG. 3 in accordance with the present invention.

The generation of the motion detection metric c(i,j) in motion detector 44 will be described in conjunction with FIGS. 4 and 5. FIG. 4 shows three sequential frames in the input video bitstream: a current frame N, a previous frame N−1, and a subsequent frame N+1. These three frames may be stored in the memory 40 of preprocessor 23, and as noted above may include only luma pels. Memory 40 may thus be configured as a three frame-store memory in order to minimize the hardware requirements of the preprocessor 23. The motion detector 44 processes each luma pel in the current, previous and subsequent encoded frames N, N−1 and N+1. Referring to FIG. 1 and TABLE 1 which set forth the dimensions of an exemplary encoded frame, all luma pels (i,j) in locations ($1 \leq m \leq m_{max}-2$, $2 \leq n \leq n_{max}-3$) may be processed in motion detector 44. For example, in the case of an encoded NTSC frame, each luma pel in lines 1–478 and columns 2–701 may be processed.

Motion detector 44 initially generates a first motion metric $m_1(i,j)$ for each luma pel (i,j) by subtracting a pel (i,j) in current frame N from the corresponding pel (i,j) in the previous frame N−1, in accordance with the following equation:

$$m_1(i,j) = |p_{N-1}(i,j) - p_N(i,j)|,$$

in which $p_k(i,j)$ refers to the (i,j)-th pel for frame k. The motion detector 44 also generates a second motion metric $m_2(i,j)$ for each luma pel (i,j) by subtracting pel (i,j) in subsequent frame N+1 from the corresponding pel (i,j) in the current frame N, in accordance with the following equation:

$$m_2(i,j) = |p_N(i,j) - p_{N+1}(i,j)|$$

The resulting first and second motion metrics are then separately thresholded against a threshold value $T_1$ to create first and second binary motion indicator (BMI) bitmaps $b_N(i,j)$ and $b_{N+1}(i,j)$, respectively. The thresholding is performed such that $b_N(i,j)=1$ when $m_1(i,j) \geq T_1$ and $b_N(i,j)=0$ when $m_1(i,j)<T_1$. Similarly, $b_{N+1}(i,j)=1$ when $m_2(i,j) \geq T_1$ and $b_{N+1}(i,j)=0$ when $m_2(i,j)<T_1$. Each bit of these BMI bitmaps thus indicates whether the corresponding motion metric specifies a magnitude of interframe motion which is greater than or equal to the selected threshold. A suitable value for T1 is on the order of 18 for both NTSC and PAL formats, although this value will generally vary depending upon the amount of motion detection-based filtering desired in a given application. For example, as T1 is increased, less motion will be detected, resulting in less motion detection-based selective filtering of the corresponding frames.

The first and second BMI bitmaps are used to generate a neighborhood binary motion indicator (NBMI) bitmap made up of the motion detection metrics $c(i,j)$. A $c(i,j)$ value of binary one in the NBMI bitmap indicates an amount of interframe motion above a predetermined threshold $T_2$, while a $c(i,j)$ value of binary zero represents an amount of interframe motion below the threshold $T_2$. The values of $c(i,j)$ making up the NBMI bitmap are determined for a given pel $(i,j)$ using the BMI bitmap values for a group of pels including the pel $(i,j)$, two rows of five pels above the pel $(i,j)$ and two rows of five pels below the pel $(i,j)$.

Figure 5:
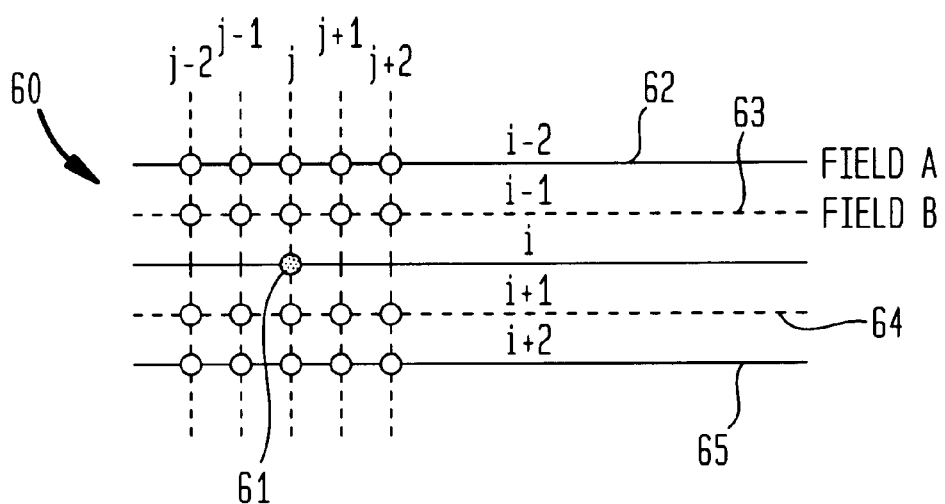
FIG. 5 illustrates a group of pels which may be present in each of the previous, current and subsequent frames of FIG. 4.

FIG. 5 illustrates the arrangement of pel values used to determine the motion detection metric $c(i,j)$ for a given pel $(i,j)$. The pel $(i,j)$ is designated by reference numeral 61 in FIG. 5. Rows 62 and 63 are located above the pel $(i,j)$ and each include five pels which will be used to determine the metric $c(i,j)$. Rows 64 and 65 are located below the pel $(i,j)$ and each include five pels which will also be used to determine the metric $c(i,j)$. The metric $c(i,j)$ is thus based on the first and second BMI bitmap values for a group of 21 neighboring pels. The motion detection metric $c(i,j)$ is determined by summing all the first and second BMI bitmap values $b_N(i,j)$ and $b_{N+1}(i,j)$ for all 21 pels in a given group centered about the pel $(i,j)$, and comparing the result to the second threshold value $T_2$. More specifically, the motion detection metric $c(i,j)$ is a binary one when the resulting sum of BMI bitmap values $b_N(i,j)$ and $b_{N+1}(i,j)$ for all 21 pels is greater than or equal to the threshold $T_2$, and is a binary zero otherwise. This determination of a $c(i,j)$ value is repeated for each luma pel $(i,j)$ in the frame. A given pel $(i,j)$ is considered to be in motion if its corresponding motion detection metric $c(i,j)$ has a value of binary one. The exemplary pel arrangement of FIG. 5, in which the pel $(i,j)$ is the only pel on line i used in the summing process, improves the ability of the motion detector 44 to differentiate between a normal moving object and a line of impulse noise in a static background.

The second threshold value $T_2$, like the first threshold value $T_1$, may be selected to determine the amount of motion detected in a given application and thereby the amount of subsequent detection-based filtering which will be applied to the corresponding frame. For example, larger values of either $T_1$ or $T_2$ will result in fewer motion detection metrics $c(i,j)$ having a value of binary one and therefore a lower amount of motion indicated in the frame. Suitable values for $T_2$ in an embodiment utilizing the pel arrangement of FIG. 5 are on the order of 4 to 20 for both NTSC frames and PAL frames. These values in conjunction with a $T_1$ value on the order of 10 to 30 will result in on average about 10 to 30 percent of a given frame being detected as in motion. As will be described in detail below, the percentage of pels for which motion is detected corresponds approximately to the percentage of pels which will be subsequently filtered. In an alternative embodiment in which five pels on line i are used in the summing process to generate the metric $c(i,j)$, the value of $T_2$ may be selected as a higher value in order to avoid the possibility of misclassifying single-line impulse noise as motion.

Although illustrated as a part of the video preprocessor 23, the motion detection metrics $c(i,j)$ generated by the motion detector 44 may be used in numerous alternative motion detection applications. These alternative applications need not involve video compression, and may include video processing applications in which image embellishment or enhancement is performed selectively based on an amount of detected motion. The NBMI metric $c(i,j)$ provides a significantly more robust motion indication than conventional motion detection metrics in part by summing BMI bitmap values in a selected neighborhood of pels surrounding a given target pel. This improved metric recognizes the fact that a given BMI bitmap value may be triggered by a relatively small amount of random noise in the image being processed. By summing the BMI values in a selected neighborhood before determining if a given pel is in motion, the detection metric becomes substantially more robust to noisy pels. In alternative embodiments, other sums of BMI values may be used in conjunction with or in place of the motion detection $c(i,j)$ to provide a more granular indication of the amount of motion.

The motion detector 44 may also be configured to generate a frame-wise motion activity measure M for each pel of a given frame based on the corresponding $c(i,j)$ metrics for that frame. The motion activity measure M of the given frame represents a qualitative measure of the motion activity in that frame. The motion detector 44 generates a motion activity measure M by initially defining a region $\Omega$ within the frame. It will again be assumed that an encoded NTSC frame is 704×480 pels and an encoded PAL frame is 704×576 pels as specified in TABLE 1 above. The region $\Omega$ in an exemplary embodiment may be defined to include pels in 128 columns n, with each column number given by 33+5i for $0 \leq i \leq 127$, and pels on 64 lines m, with each line number given by 16+7i for $0 \leq i \leq 63$. The first column in the region $\Omega$ is therefore n=33 and the last column is n=668, while the first line is m=16 and the last line is m=457, such that the region $\Omega$ in this example includes a total of 128×64 or $2^{13}$ pels. An unscaled motion activity measure is then generated by summing the values of the motion detection metrics $c(i,j)$ for each pel in the region $\Omega$, to thereby provide a number between 0 and $2^{13}$. The resulting number is scaled to provide a three-bit motion activity measure M, in which the three bits represent the three most significant bits (MSBs) of the unscaled measure. The measure M in this exemplary embodiment is thus a binary number with a value between 0 and 7. The measure M is supplied from the motion detector 44 via line 35 along with the motion detection metric $c(i,j)$ to an input of the look-up table 30.

Figure 6:
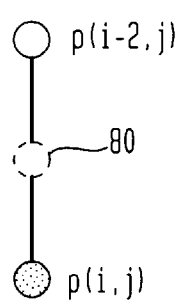
FIG. 6 illustrates a portion of one column of pels suitable for use in an edge detector in the video preprocessor of FIG. 3.

The edge detector 46 of the pre-compression statistics generator 42 provides an edge detection metric Edge$(i,j)$ which indicates whether a given pel $(i,j)$ is part of an edge in the image. The video preprocessor 23 of the present invention utilizes the edge detection metric Edge$(i,j)$ to control filter selection using the look-up table 30 as shown in FIG. 3. In an exemplary embodiment, a field-based edge detection algorithm uses a column of pels to generate a multi-bit metric Edge$(i,j)$. The algorithm is applied to all pels $(i,j)$ at locations ($1 \leq m \leq m_{max}$, $2 \leq n \leq n_{max}$) as specified in TABLE 1 above. A pel difference $d(i,j)$ is generated for each pel $(i,j)$ in accordance with the following equation:

$$d(i,j) = |p(i,j) - p(i-2,j)|,$$

in which $p(i,j)$ refers to the value of pel $(i,j)$ and $p(i-2,j)$ refers the value of a pel $(i-2,j)$ vertically adjacent to pel $(i,j)$ in the same field. FIG. 6 illustrates the relative positions of pels $(i,j)$ and $(i-2,j)$. The pel value $p(i,j)$ may represent a pel to be replaced by a filtered value as will be described in greater detail below. A pel designated by reference numeral 80 represents a pel in another field and is not utilized in generating the edge detection metric Edge$(i,j)$ in this example. The resulting pel differences $d(i,j)$ are summed over the above-defined region Ω. An average pel difference $\mu_e$ is then generated by dividing the sum of pel differences by the number $2^{13}$ which represents the total number of pel differences in the region Ω. A conventional left-shift operation may be used to perform the division.

The average pel difference $\mu_e$ is used to partition a range from 0 to 255 into four intervals specified by boundaries {0, $t_1$, $t_2$, $t_3$, 255}, where $t_1=\mu_e/2$, $t_2=\mu_e$ and $t_3=\mu_e+8$. A range of 0 to 255 is used in this exemplary embodiment because the pels generally have 8-bit pel values. Other ranges and numbers of partitions could also be used. For example, a two-partition implementation could be used with boundaries {0, $t_1$, 255} in which $t_1=\mu_e$. A 4-bit edge detection metric Edge(i,j) is determined for the four-partition case as follows:

$$Edge(i, j) = 0, t_3 \leq d(i, j),$$
$$1, t_2 \leq d(i, j) < t_3,$$
$$2, t_1 \leq d(i, j) < t_2, \text{ and}$$
$$3, d(i, j) < t_1.$$

The edge detection metric Edge(i,j) defines the degree of contrast for a given pel. For example, an Edge(i,j) value of binary zero implies that the pel (i,j) is in the sharpest contrast region, an Edge(i,j) value of binary one implies that the pel (i,j) is in the next sharpest contrast region, and so on. It should be noted that the above-described edge detection techniques may be applied to horizontal edge detection as well as vertical edge detection.

Figure 7:
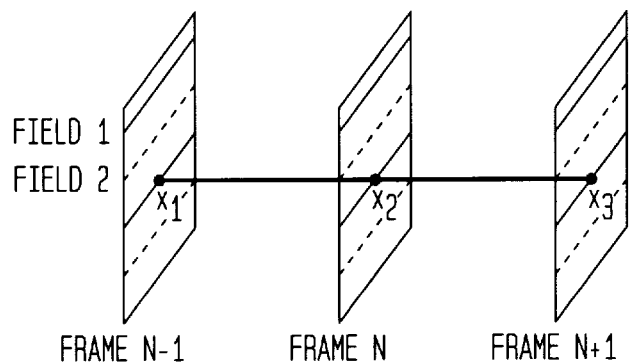
FIG. 7 illustrates adjacent previous, current and subsequent video frames which may be supplied to a temporal median filter in the video preprocessor of FIG. 3 in accordance with the present invention.
Figure 8:
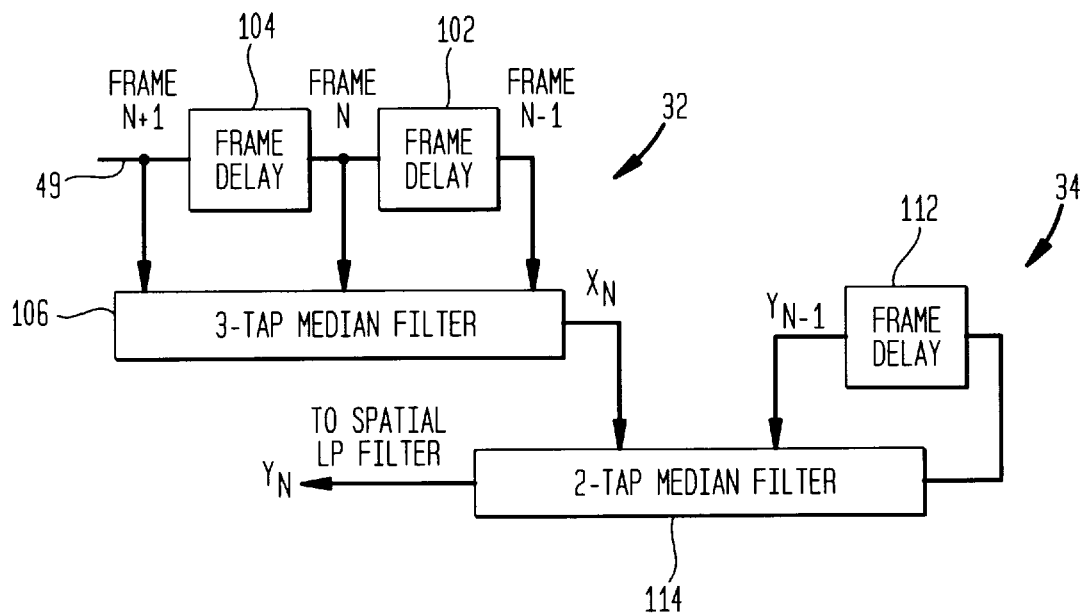
FIG. 8 is a block diagram showing exemplary temporal median and temporal lowpass filters suitable for use in the video preprocessor of FIG. 3 in accordance with the present invention.

As noted above, the video preprocessor 23 of FIG. 3 includes a temporal median filter 32, a temporal lowpass filter 34 and an adaptive vertical lowpass filter 36. FIG. 7 illustrates an exemplary 3-tap temporal median filtering operation suitable for use in a video preprocessor in accordance with the invention. FIG. 8 is a block diagram illustrating an exemplary 3-tap temporal median filter 32 and its interconnection with the temporal lowpass filter 34.

The median filtering process is well-suited for removing impulse noise that primarily affects only a single line of pels in a given field. It should be noted that this type of noise can usually be removed by median filtering applied either spatially in the vertical direction or temporally. Both spatial and temporal median filtering generally utilize a sliding window having an odd-valued length L centered on the pel to be filtered. The length L is also referred to as the number of taps in the median filter. FIG. 7 illustrates an exemplary 3-tap temporal median filtering operation utilizing three successive frames including a current frame N, a previous frame N−1, and subsequent frame N+1. Median filtering is applied to a given pel $x_2$ of frame N by taking the median of the given pel $x_2$ and corresponding pels $x_1$ and $x_3$ of frames N−1 and N+1, respectively. The original value for pel $x_2$ is then replaced with the resulting median value. For example, assuming that a sequence of corresponding frame pel values is given by {0, 0, 0, 0, 3, 2, 8, 0, 1, 2, 2, 3, 5, 9, 0, 0}, the resulting median-filtered pel values will be given by {0, 0, 0, 2, 3, 2, 1, 1, 2, 2, 3, 5, 5, 0, . . . } in the case of a 3-tap median filter. An important property of a median filter of length L is that it can filter out edges having a width less than or equal to (L−1)/2 while at the same time passing edges having widths greater than (L−1)/2. A 3-tap median filter has a length L of three and is therefore able to eliminate single-line impulse noise which generally has a width of one both temporally and spatially.

FIG. 8 shows an exemplary temporal median filter 32 including first and second frame delay elements 102, 104 and a 3-tap median filter 106. As noted above, pels from frames N−1, N and N+1 are used to filter frame N. Frame N+1 therefore must be received before frame N can be filtered. A one-frame delay will therefore be produced as a result of the 3-tap median filtering process. The frame delay elements 102, 104 serve to present the appropriate frame information to the 3-tap median filter 106 at the appropriate time. For each pel (i,j) in the frame N to be filtered, the corresponding pels from frames N−1 and N+1 are obtained and a median value is generated. A given median value $y_2$ will replace a given pel $x_2$ of the frame N if the following conditions are met:

$$|y_2-x_2| \geq T_3 \text{ and } c(i,j)=0$$

where $T_3$ is a threshold value selected using criteria similar to those described above for threshold values $T_1$ and $T_2$. A suitable value for threshold $T_3$ is on the order of 30. The median value will therefore replace the original pel value only is the difference between the two values exceeds a certain threshold and the motion detection metric c(i,j) indicates no motion. The motion detection metric c(i,j) thus determines whether temporal median filtering will be applied to a given pel in that if the given pel is determined to be in motion, temporal median filtering is not applied to that pel. The motion detection metric c(i,j) is supplied to temporal median filter 32 from motion detector 44 via line 31 as shown in FIG. 3. It should be noted that conventional motion detection metrics may be utilized in place of the metric c(i,j) in determining whether a given pel should be median filtered. If the above-noted conditions are not met, the original unfiltered pel value is utilized instead of the median filtered pel value. The above-described temporal median filtering process is repeated for all pels (i,j) in the range ($2 \leq i \leq m_{max}-2$, $1 \leq j \leq n_{max}-1$) in each frame to be filtered.

FIG. 8 also shows an exemplary embodiment of a temporal lowpass filter 34 in accordance with the present invention. Temporal lowpass filtering is used in accordance with the present invention to remove both additive noise and line impulse noise. The exemplary temporal lowpass filter 34 includes a frame delay element 122 and a 2-tap lowpass filter 114. The output of the 2-tap lowpass filter is designated $y_N$. The inputs of the 2-tap lowpass filter include an output $x_N$ of the 3-tap median filter 106, and a one-frame delayed version of the lowpass filter output $y_N$ designated $y_{N-1}$. The exemplary 2-tap lowpass filter thus utilizes only frames N and N−1 to filter frame N. The lowpass filtering therefore requires only two frame stores of memory capacity and does not introduce any additional processing delay.

A sequence of original pel values at a given spatial position are designated as {. . . , $x_{N-1}$, $x_N$, $x_{N+1}$, . . . } and are applied to an input of the 2-tap lowpass filter 114. The output of the filter 114 is a sequence of temporally filtered pel values designated as {. . . , $y_{N-1}$, $y_N$, $y_{N+1}$, . . . }. The temporal filtering is applied to the sequence of original pel values using the original pel value $x_N$ of the current frame and the corresponding filtered pel value $y_{N-1}$ of the previous frame, in accordance with the following relationship:

$$y_N = a_1 y_{N-1} + a_2 x_N \text{ if } c(i,j)=0$$

$$y_N = x_N \text{ if } c(i,j)=1$$

for values of $N \geq 1$ and in which $y_0=x_0$. The motion detection metric c(i,j) is supplied to the temporal filter 34 from the motion detector 44 via the line 33 as shown in FIG. 3. The application of the temporal lowpass filtering to a given pel (i,j) is therefore determined based on the value of the motion detection metric $c(i,j)$ for that pel. If the pel has been determined to be in motion as shown by a $c(i,j)$ value of one, the 2-tap lowpass filter 114 outputs $y_N$ as the original pel value $x_N$. The values $a_1$ and $a_2$ represent the coefficients of the 2-tap filter 114 and in this example satisfy the relationships $a_1+a_2=1$ and $a_2 \geq \frac{1}{2}$. The first relationship ensures stability in the filter transfer function, and the second specifies that the current frame will receive more weight than the past frame. Six possible sets of coefficients $\{a_1, a_2\}$ satisfying these relationships are defined as follows:

$$A_0 = \{3/4, 1/4\},$$

$$A_1 = \{5/8, 3/8\},$$

$$A_2 = \{1/2, 1/2\},$$

$$A_3 = \{1/4, 3/4\},$$

$$A_4 = \{1/8, 7/8\},$$

$$A_5 = \{0, 1\}.$$

It should be apparent that the $A_0$ set of 2-tap filter coefficients provides the maximum amount of temporal filtering, while the $A_5$ set provides no temporal filtering. The set of filter coefficients selected for use with a given frame may be a function of the encoding bitrate. The encoding bitrate for a given frame may be supplied to the 2-tap filter 114 and used to select one of the six designated sets of coefficients in accordance with TABLE 2 below.

TABLE 2

| Bitrate R | Filter Coefficients |
|---|---|
| $0 \leq R < R_1$ | $A_0$ |
| $R_1 \leq R < R_2$ | $A_1$ |
| $R_2 \leq R < R_3$ | $A_2$ |
| $R_3 \leq R < R_4$ | $A_3$ |
| $R_4 < R$ | $A_4$ |

The values $R_1$ to $R_4$ in TABLE 2 may be as follows: $R_1=1.5$ Mbps, $R_2=3.0$ Mbps, $R_3=4.5$ Mbps and $R_4=6.0$ Mbps. The temporal lowpass filtering is turned off by using the $A_5$ set of coefficients when the frame encoding bitrate is above a predetermined maximum value. This maximum value may be in the range between about 6.0 and 8.0 Mbps.

It should be noted that post-compression statistics generated by the compression circuit 24 may be used to assist in the selection of filter coefficients for the temporal lowpass filter 34. FIG. 3 indicates that these post-compression statistics may be supplied from the compression circuit 24 to the temporal lowpass filter 34 via line 47. An exemplary post-compression statistic suitable for use in selecting coefficients for the temporal lowpass filter 34 is a 2-bit frame coding activity measure generated for each frame. This frame coding activity may be generated in a conventional manner utilizing well-known techniques. Examples of suitable frame coding activity measures include the sum of local spatial pel absolute differences, and the sum of high frequency discrete cosine transform (DCT) coefficients. The frame coding activity measure assists the filter selection process by predicting the degree of difficulty the MPEG-2 compression circuit will face. For example, a higher frame coding activity may indicate that stronger temporal and/or spatial filtering should be applied in the video preprocessor.

The adaptive vertical lowpass filter 36 receives the output of temporal lowpass filter 34. As will be described in greater detail below, the look-up table 30 is used to select one of k sets of filter coefficients $\{h_k(i)\}$ for use in the adaptive vertical lowpass filter 36. This adaptive lowpass filter selection process utilizes the motion detection metric $c(i,j)$ and frame-wise motion activity measure M supplied from motion detector 44 to the look-up table 30 via line 35, and the edge detection metric $Edge(i,j)$ supplied from edge detector 46 to the look-up table 30 via line 37. Other pre-compression statistics such as the encoding bitrate R may also be supplied to the look-up table 30 or the adaptive lowpass filter 36 and used in the selection process. The adaptive lowpass filter selection may also utilize post-compression statistics supplied from the compression circuit 24 via line 48 to the look-up table 30. The filter selection is generally made on a pel-by-pel basis, such that a different set of filter coefficients may be chosen for each pel. The filter selected for a given pel utilizes the given pel and a number of its neighboring pels to perform the filtering. The resulting column or line is therefore generally not a linear-filtered version of the original line. The use of pre-compression statistics in the filter selection process results in a filtered image which preserves a substantial number of edges and contours in the original image while also removing many undesirable high frequency components.

In an exemplary embodiment, the adaptive lowpass filter 36 is implemented as a 7-tap filter. As noted above, the look-up table 30 is accessed to select one of k sets of filter coefficients for each pel $(i,j)$ in a given frame. A given 7-tap filter using the k-th set of coefficients $\{h_k(i)\}$ will be referred to as filter $F_k$. The value of k may be selected as sixteen in a given embodiment, such that the look-up table 30 permits the selection of one of 16 possible sets of filter coefficients $\{h_k(i)\}$ for the 7-tap filter, and therefore one of 16 possible lowpass filters $F_0$ through $F_{15}$. The look-up table 30 is configured such that an address into the table is provided by a combination of the above-described statistics $c(i,j)$, M, and $Edge(i,j)$. The address specifies a particular entry in the look-up table 30 and therefore one of the sixteen possible sets of coefficients $\{h_k(i)\}$. The look-up table 30 may be configured to include on the order of 2048 different entries, thus specifying a particular set of filter coefficients for 2048 different combinations of values of the statistics $c(i,j)$, M and $Edge(i,j)$. Of course, a wide variety of alternative configurations may be used for the look-up table 30.

A given set of filter coefficients $\{h_k(i)\}$ may be determined using conventional techniques such as well-known Kaiser windowing of ideal lowpass filters. The cutoff frequencies $f_k$ provided by the sets of coefficients $\{h_k(i)\}$ may be selected so as to cover a range of cutoff frequencies that are suitable for use with bit rates from 1.5 Mbps to 6–8 Mbps or more. The 7-tap filter transfer function may be expressed as a Fourier series given by:

$$H(\omega) = \sum h(n) e^{-jn\omega},$$

in which the summation is taken for $n \geq 0$. In this case the corresponding cutoff frequencies $f_k$ are independent of bitrate and are given by:

$$f_k = (16-k)\pi/16, \ 0 \leq k \leq 15.$$

For k=0, the cutoff frequency $f_k=\pi$ and the resulting filter $F_0$ is the weakest filter in the set and operates as an approximate all-pass filter. For k=15, the cutoff frequency $f_k=\pi/16$ and the corresponding filter $F_{15}$ provides the greatest amount of filtering of any filter in the set. The following is a list of sixteen exemplary sets of filter coefficients suitable for use in the adaptive lowpass filter 36 in accordance with the present invention.

Filter $F_0$: cutoff_frequency = 1.000000 * pi:
h[1] = 0.000000;
h[2] = 0.000000;
h[3] = 0.000000;
h[4] = 1.000000;
h[5] = 0.000000;
h[6] = 0.000000;
h[7] = 0.000000;
Filter $F_1$: cutoff_frequency = 1.937500 * pi:
h[1] = 0.014749;
h[2] = -0.030477;
h[3] = 0.046611;
h[4] = 0.938235;
h[5] = 0.046611;
h[6] = -0.030477;
h[7] = 0.014749;
Filter $F_2$: cutoff_frequency = 0.87500 * pi:
h[1] = 0.024650;
h[2] = -0.056599;
h[3] = 0.91893;
h[4] = 0.880112;
h[5] = 0.091893
h[6] = -0.056599;
h[7] = 0.024650;
Filter $F_3$: cutoff frequency = 0.812500 * pi:
h[1] = 0.026473;
h[2] = -0.074810;
h[3] = 0.134960;
h[4] = 0.826755;
h[5] = 0.134960
h[6] = -0.074810
h[7] = 0.026473;
Filter $F_4$: cutoff_frequency = 0.750000 * pi:
h[1] = 0.019417;
h[2] = -0.082380;
h[3] = 0.174755;
h[4] = 0.776416;
h[5] = 0.174755;
h[6] = -0.082380;
h[7] = 0.019417;
Filter $F_5$: cutoff_frequency = 0.687500 * pi:
h[1] = 0.005460;
h[2] = -0.077569;
h[3] = 0.209429;
h[4] = 0.725358;
h[5] = 0.209429;
h[6] = -0.077569;
h[7] = 0.005460;
Filter $F_6$: cutoff_frequency = 0.625000 * pi:
h[1] = -0.010877;
h[2] = -0.060293;
h[3] = 0.236328;
h[4] = 0.669682;
h[5] = 0.236328;
h[6] = -0.060293;
h[7] = -0.010877;
Filter $F_7$: cutoff_frequency = 0.562500 * pi:
h[1] = -0.023824;
h[2] = -0.032895;
h[3] = 0.252918;
h[4] = 0.607600;
h[5] = 0.252918;
h[6] = -0.032895;
h[7] = -0.023824;
Filter $F_8$: cutoff_frequency = 0.500000 * pi:
h[1] = -0.028695;
h[2] = 0.000000;
h[3] = 0.258253;
h[4] = 0.540884;
h[5] = 0.258253;
h[6] = 0.000000;
h[7] = -0.028695;
Filter $F_9$: cutoff_frequency = 0.437500 * pi:
h[1] = -0.023906;
h[2] = 0.033008;
h[3] = 0.253792;
h[4] = 0.474211;
h[5] = 0.253792;
h[6] = 0.033008;

h[7] = -0.023906;
Filter $F_{10}$: cutoff_frequency = 0.375000 * pi:
h[1] = -0.011175;
h[2] = 0.061947;
h[3] = 0.242812;
h[4] = 0.412833;
h[5] = 0.242812;
h[6] = 0.061947;
h[7] = -0.011175;
Filter $F_{11}$: cutoff_frequency = 0.312500 * pi:
h[1] = 0.005970;
h[2] = 0.084809;
h[3] = 0.228979;
h[4] = 0.360485;
h[5] = 0.228979;
h[6] = 0.084809;
h[7] = 0.005970;
Filter $F_{12}$: cutoff_frequency = 0.250000 * pi:
h[1] = 0.023915;
h[2] = 0.101465;
h[3] = 0.215239;
h[4] = 0.318761;
h[5] = 0.215239;
h[6] = 0.101465;
h[7] = 0.023915;
Filter $F_{13}$: cutoff_frequency = 0.187500 * pi:
h[1] = 0.039912;
h[2] = 0.112789;
h[3] = 0.203475;
h[4] = 0.287648;
h[5] = 0.203475;
h[6] = 0.112789;
h[7] = 0.039912;
Filter $F_{14}$: cutoff_frequency = 0.125000 * pi:
h[1] = 0.052223;
h[2] = 0.119909;
h[3] = 0.194683;
h[4] = 0.266371;
h[5] = 0.194683;
h[6] = 0.119909;
h[7] = 0.052223;
Filter $F_{15}$: cutoff_frequency = 0.062500 * pi:
h[1] = 0.059899;
h[2] = 0.123778;
h[3] = 0.189305;
h[4] = 0.254035;
h[5] = 0.189305;
h[6] = 0.123778;
h[7] = 0.059899;

As noted above, the look-up table 30 receives as inputs from lines 35 and 37 the pre-compression statistics c(i,j), M and Edge(i,j) for a given pel (i,j). The look-up table provides as an output on line 39 the signal f(i,j) which represents one of the sixteen sets of filter coefficients $\{h_k(i)\}$ and therefore one of the filters $F_0$ through $F_{15}$ selected for the given pel based on the statistics for that pel. The look-up table 30 may also receive certain post-compression statistics from the compression circuit 24 via line 48 as shown in FIG. 3. These post-compression statistics include the above-described frame coding activity measure as well as other statistics such as frame count, total bits used, total bits stuffed, frame type, sum of mquants and sum of motion estimation vectors. The look-up table 30 uses the post-compression statistics to facilitate the selection process.

In an exemplary embodiment, the filter selection process may be based in part on a moving average of the post-compression statistics. A number of different techniques may be used to provide the moving average. Each of these techniques may also utilize a frame type (I/P/B) indication to account for frame type related differences in the post-compression statistics. One possible technique involves providing the moving average of the sum of mquants on a frame by frame basis, in which the average value is defined by a sliding average window which may be about 10 to 20 frames in size. An increase in the average value of mquant may indicate that the video image is becoming more blocky and that more filtering should therefore be applied. Another technique involves providing the moving average of the sum of the absolute values of the motion vectors. An increase in this moving average indicates a higher motion content in the video, such that more filtering could be applied without visual degradation. Another exemplary technique involves providing the moving average of the number of bits per compressed frame. An increase in this moving average indicates that the video is becoming more difficult to compress. These and other measures of post-compression statistics could be used in the filter selection process in accordance with the invention.

It should also be noted that more than one look-up table may be utilized in the adaptive lowpass filter selection process. For example, different look-up tables may be used to provide different percentages of total filtering for a given frame. In such an embodiment, a first look-up table may include entries set up such that approximately 30% of the pels in a given frame are filtered, while a second look-up table includes entries set up such that approximately 20% of the pels in a given frame are filtered. Many other alternative look-up table configurations will be apparent to those skilled in the art.

A subset of the entries of the look-up table 30 may be identified as particularly well-suited for filtering a given pel or group of pels. This identification process may make use of a number of assumptions. For example, it may be assumed that a higher bit rate requires less filtering, a higher global coding activity measure requires more filtering, and a higher motion activity allows more filtering. An exemplary index I of a preferred subset of look-up table entries may specify a subset of four of the possible sixteen filters. The index I may be determined based on the above-described frame activity measures M from motion detector 44 and the reference bitrate R in accordance with the following equation:

$$I = \lfloor aM_2/AR \rfloor$$

in which a represents a scaling factor which is selected such that I falls within the proper range, the variable $M_2$ represents the sum of the frame activity measures M of the current frame N with respect to both the previous frame N−1 and the subsequent frame N+1, and the variable A represents the frame coding activity. An exemplary scaling factor a may be on the order of $1.5 \times 1800^2$. Other suitable scaling factors may also be used and will generally vary depending upon the type of pre-compression and/or post-compression statistics used in the selection process. The entries specified by the index I need not be adjacent entries in the look-up table 30. The value of I is generally indicative of how "spread out" the selected filters are. For example, for a value of I=1, the selected filters may be $F_1$, $F_3$, $F_5$ and $F_8$, while for I=3, the selected filters may be $F_1$, $F_4$, $F_7$ and $F_{11}$. A larger value of I thus implies that on average stronger filters are selected. It should be noted that the reference bitrate R used in determining the index I may or may not be the same as the actual encoding rate. For example, in embodiments in which post-compression statistics are used in the filter selection process, the reference bitrate R may be adjusted around the actual encoding bitrate using the post-compression statistics in the manner described above. This adjustment in R may also be based on the previously-described frame-wise motion activity measure M. In an embodiment in which post-compression statistics are unavailable or otherwise unused, the reference bitrate R may be set equal to the encoding bitrate. The adaptive temporal lowpass filtering provided in filter 36 as well as the temporal lowpass filtering provided in filter 34 may be turned off if the reference bitrate R exceeds a predetermined threshold. This threshold may be on the order of 6 to 8 Mbps.

In an embodiment which utilizes the above-described subset index I, the look-up table output f(i,j) for a given pel (i,j) may be given by:

$$f(i,j) = \text{Motion}(i,j) + \text{Edge}(i,j) \times Si,$$

where Motion(i,j) is a variable defined such that Motion(i,j)=4 when Edge(i,j)≧1 and c(i,j)=1, and Motion(i,j)=0 otherwise. The variable s represents a spreading factor which in this exemplary embodiment may be selected in the range between about 2 and 10. A larger value of s will generally result in less filtering being applied to pels near a detected edge, while a smaller value of s is small will generally result in more filtering for pels near a detected edge. The above equation which uses the index I in the filter selection process ensures that more filtering is applied to a given pel if motion has been detected for that pel, while also ensuring that no filtering will be applied if the edge contrast of the pel is sharp. The factor Si insures that as I increases due to either a lower reference bitrate or a higher global coding activity, smaller contrast edges will be subject to more filtering than in cases in which I is smaller.

As noted above, one of the filters $F_k$ is selected using the look-up table 30, and the corresponding set of filter coefficients $\{h_k(i)\}$ are supplied to the 7-tap adaptive lowpass filter 36. If $X=\{x_n\}$ specifies an input pel sequence applied to the adaptive lowpass filter 36 and $Y=\{y_n\}$ the corresponding filtered output pel sequence, the adaptive lowpass filtering applied to each input sequence pel is given by the following equation:

$$y_n = \sum_{0 \leq i \leq N_{tap}-1} h_k(i) x_{i-n}$$

in which $N_{tap}$ is seven in this exemplary 7-tap filter embodiment. The resulting filtered output pel sequence $\{y_n\}$ is applied to the input of the compression circuit 24 which applies MPEG-2 compression in a conventional manner. Although the adaptive spatial lowpass filter 36 is described above as a vertical lowpass filter, other embodiments could utilize similarly-configured horizontal filtering, or both horizontal and vertical filtering. For example, an alternative embodiment could utilize both horizontal and vertical spatial filtering to thereby provide effective two-dimensional spatial filtering.

As noted above, the present invention provides a robust motion detection metric particularly well-suited for use in controlling filter selection in a video preprocessor. A video preprocessor in accordance with the invention may provide temporal median filtering, temporal lowpass filtering and/or adaptive lowpass filtering controlled using pre-compression statistics which include the motion detection metric, an edge detection metric, and a frame-wise motion activity measure. The motion detection controlled preprocessor filtering of the present invention provides substantially improved video quality when the compressed pel data is subsequently decompressed and displayed.

It should be understood that the foregoing description is merely illustrative of the invention. Numerous alternative embodiments within the scope of the appended claims will be apparent to those of ordinary skill in the art.

The claimed invention is:

1. A method of processing a video signal including a sequence of frames, each of the frames including a plurality of pels, the method comprising the steps of:

generating a first motion metric as a difference between a given pel in a current frame of the frame sequence and a corresponding pel in a previous frame of the sequence, and a second motion metric as a difference between the given pel of the current frame and a corresponding pel in a subsequent frame of the sequence;

generating first and second bitmaps from the first and second motion metrics, such that each of the first and second bitmaps have one value for the given pel if the first and second motion metrics, respectively, exceed a first predetermined threshold, and another value for the given pel otherwise; and generating a motion detection metric for the given pel of the current frame such that the motion detection metric for the given pel has one value if a sum of the first and second bitmap values for a group of pels including the given pel exceeds a second predetermined threshold, and another value otherwise.

2. The method of claim 1 wherein the group of pels for which the first and second bitmap values are summed further includes pels on one or more lines above a line containing the given pel and one or more lines below the line containing the given pel.

3. The method of claim 1 wherein the group of pels for which the first and second bitmap values are summed further includes pels on two lines above a line containing the given pel and two lines below the line containing the given pel.

4. The method of claim 1 wherein the group of pels for which the first and second bitmap values are summed further includes five pels on each of two lines above a line containing the given pel, and five pels on each of two lines below the line containing the given pel.

5. The method of claim 1 further including the step of utilizing the motion detection metric to determine if temporal median filtering should be applied to the given pel.

6. The method of claim 1 further including the step of utilizing the motion detection metric to determine if temporal lowpass filtering should be applied to the given pel.

7. The method of claim 1 further including the step of utilizing the motion detection metric to determine if spatial lowpass filtering should be applied to the given pel.

8. The method of claim 1 further including the step of utilizing the motion detection metric to determine an amount of spatial lowpass filtering to be applied to the given pel.

9. The method of claim 8 wherein the step of utilizing the motion detection metric to determine an amount of spatial lowpass filtering to be applied to the given pel further includes the step of utilizing the motion detection metric to generate an address into a look-up table including a plurality of entries each specifying a set of spatial lowpass filter coefficients.

10. An apparatus for processing a video signal including a sequence of frames, each of the frames including a plurality of pels, the apparatus comprising:

a memory for storing one or more frames of the frame sequence; and a motion detector coupled to the memory and operative to generate a first motion metric as a difference between a given pel in a current frame of the frame sequence and a corresponding pel in a previous frame of the sequence, to generate a second motion metric as a difference between the given pel of the current frame and a corresponding pel in a subsequent frame of the sequence, to generate first and second bitmaps from the first and second motion metrics, such that each of the first and second bitmaps have one value for the given pel if the first and second motion metrics, respectively, exceed a first predetermined threshold, and another value for the given pel otherwise, and to generate a motion detection metric for the given pel of the current frame such that the motion detection metric for the given pel has one value if a sum of the first and second bitmap values for a group of pels including the given pel exceeds a second predetermined threshold, and another value otherwise.

11. The apparatus of claim 10 wherein the group of pels for which the first and second bitmap values are summed further includes pels on one or more lines above a line containing the given pel and one or more lines below the line containing the given pel.

12. The apparatus of claim 10 wherein the group of pels for which the first and second bitmap values are summed further includes pels on two lines above a line containing the given pel and two lines below the line containing the given pel.

13. The apparatus of claim 10 wherein the group of pels for which the first and second bitmap values are summed further includes five pels on each of two lines above a line containing the given pel, and five pels on each of two lines below the line containing the given pel.

14. The apparatus of claim 10 further including a temporal median filter coupled to the motion detector and having an input for receiving the motion detection metric therefrom, such that the value of the motion detection metric determines if temporal median filtering will be applied to the given pel.

15. The apparatus of claim 10 further including a temporal lowpass filter coupled to the motion detector and having an input for receiving the motion detection metric therefrom, such that the value of the motion detection metric determines whether temporal lowpass filtering will be applied to the given pel.

16. The apparatus of claim 10 further including a spatial lowpass filter coupled to the motion detector such that the value of the motion detection metric determines whether spatial lowpass filtering will be applied to the given pel.

17. The apparatus of claim 16 further including a look-up table coupled between the motion detector and the spatial lowpass filter, wherein the motion detection metric is used to generate an address into the look-up table to thereby identify an entry in the table specifying a set of spatial lowpass filter coefficients.

18. A method of processing a video signal including a sequence of frames, each of the frames including a plurality of pels, the method comprising the steps of:

generating a motion detection metric for a given pel of a frame in the frame sequence, wherein said step of generating comprises the steps of:

generating a first motion metric as a difference between a given pel in a current frame of the frame sequence and a corresponding pel in a previous frame of the sequence, and a second motion metric as a difference between the given pel of the current frame and a corresponding pel in a subsequent frame of the sequence;

generating first and second bitmaps from the first and second motion metrics, such that each of the first and second bitmaps have one value for the given pel if the first and second motion metrics, respectively, exceed a first predetermined threshold, and another value for the given pel otherwise, and generating the motion detection metric for the given pel of the current frame such that the motion detection metric for the given pel has one value if a sum of the first and second bitmap values for a group of pels including the given pel exceeds a second predetermined threshold, and another value otherwise; and determining whether or not to apply a filtering operation to the given pel based on a value of the motion detection metric.

19. The method of claim 18 wherein the filtering operation includes a temporal median filtering operation.

20. The method of claim 18 wherein the filtering operation includes a temporal lowpass filtering operation.

21. The method of claim 18 wherein the filtering operation includes a spatial lowpass filtering operation comprising at least one of a horizontal and a vertical lowpass filtering operation.

22. The method of claim 18 wherein the group of pels for which the first and second bitmap values are summed further includes pels on one or more lines above a line containing the given pel and one or more lines below the line containing the given pel.

23. An apparatus for processing a video signal including a sequence of frames, each of the frames including a plurality of pels, the apparatus comprising;

a motion detector having an input connected to receive pels from one or more of said frames in said frame sequence, and an output corresponding to a motion detection metric for a given pel of a frame in the frame sequence, wherein the motion detector is operative to generate a first motion metric as a difference between a given pel in a current frame of the frame sequence and a corresponding pel in a previous frame of the sequence, to generate a second motion metric as a difference been the given pel of the current frame and a corresponding pel in a subsequent frame of the sequence, to generate first and second bitmaps from the first and second motion metrics, such that each of the first and second bitmaps have one value for the given pel if the first and second motion metrics, respectively, exceed a first predetermined threshold and another value for the given pel otherwise, and to generate the motion detection metric for the given pel of the current frame such that the motion detection metric for the given pel has one value if a sum of the first and second bitmap values for a group of pels including the given pel exceeds a second predetermined threshold, and another value otherwise; and a processor coupled to the motion detector and having an input for receiving the motion detection metric therefrom, the processor operative to determine whether or not to apply a filtering operation to the given pel based on a value of the motion detection metric.

24. The apparatus of claim 23 wherein the filtering operation includes a temporal median filtering operation.

25. The apparatus of claim 23 wherein the filtering operation includes a temporal lowpass filtering operation.

26. The apparatus of claim 23 wherein the filtering operation includes a spatial lowpass filtering operation comprising at least one of a horizontal and a vertical lowpass filtering operation.

27. The apparatus of claim 23 wherein the group of pels for which the first and second bitmap values are summed further includes pels on one or more lines above a line containing the given pel and one or more lines below the line containing the given pel.

28. A method of processing a video signal including a sequence of frames, each of the frames including a plurality of pels, the method comprising the steps of:

generating a motion detection metric and an edge detection metric for a given pel of a frame in the frame sequence, wherein said step of generating comprises the steps of:

generating a first motion metric as a difference between a given pel in a current frame of the frame sequence and a corresponding pel in a previous frame of the sequence, and a second motion metric as a difference between the given pel of the current frame and a corresponding pel in a subsequent frame of the sequence;

generating first and second bitmaps from the first and second motion metrics, such that each of the first and second bitmaps have one value for the given pel if the first and second motion metrics, respectively, exceed a first predetermined threshold, and another value for the given pel otherwise; and generating the motion detection metric for the given pel of the current frame such that the motion detection metric for the given pel has one value if a sum of the first and second bitmap values for a group of pels including the given pel exceeds a second predetermined threshold, and another value otherwise; and determining an amount of spatial lowpass filtering to apply to the given pel based on a value of the motion detection metric and the edge detection metric.

29. The method of claim 28 wherein the spatial lowpass filtering includes at least one of horizontal filtering and vertical filtering.

30. The method of claim 28 wherein the step of determining an amount of spatial lowpass filtering to apply to the given pel further includes the step of utilizing the motion detection metric and edge detection metric to generate an address into a look-up table having a plurality of entries corresponding to different filter coefficients for the spatial lowpass filtering.

31. The method of claim 30 wherein the look-up table includes sixteen different possible entries corresponding to sixteen different sets of filter coefficients for the spatial lowpass filtering.

32. The method of claim 28 wherein the group of pels for which the first and second bitmap values are summed further includes pels on one or more lines above a line containing the given pel and one or more lines below the line containing the given pel.

33. An apparatus for processing a video signal including a sequence of frames, each of the frames including a plurality of pels, the apparatus comprising:

a motion detector having an input connected to receive pels from one or more of said frames in said frame sequence, and an output corresponding to a motion detection metric for a given pel of a frame in the frame sequence, wherein the motion detector is operative to generate a first motion metric as a difference between a given pel in a current frame of the frame sequence and a corresponding pel in a previous frame of the sequence, to generate a second motion metric as a difference between the given pel of the current frame and a corresponding pel in a subsequent frame of the sequence, to generate first and second bitmaps from the first and second motion metrics, such that each of the first and second bitmaps have one value for the given pel if the first and second motion metrics, respectively, exceed a first predetermined threshold, and another value for the given pel otherwise, and to generate the motion detection metric for the given pel of the current frame such that the motion detection metric for the given pel has one value if a sum of the first and second bitmap values for a group of pels including the given pel exceeds a second predetermined threshold, and another value otherwise;

an edge detector having an input connected to receive pels from one or more of said frames in said frame sequence, and an output corresponding to an edge detection metric for a given pel of a frame in the frame sequence; and a processor coupled to the motion detector and edge detector and having an input for receiving the motion detection metric and edge detection metric therefrom, the processor operative to determine an amount of spatial lowpass filtering to be applied to the given pel based on values of the motion detection metric and the edge detection metric.

34. The apparatus of claim 33 wherein the spatial lowpass filtering includes at least one of horizontal filtering and vertical filtering.

35. The apparatus of claim 33 further including a look-up table coupled to the motion detector, the edge detector and the processor, such that the motion detection metric and edge detection metric are used to provide an address into the look-up table to specify one of a plurality of table entries corresponding to different filter coefficients for the spatial lowpass filtering.

36. The apparatus of claim 35 wherein the look-up table includes sixteen different possible entries corresponding to sixteen different sets of filter coefficients for the spatial lowpass filtering.

37. The apparatus of claim 33 wherein the group of pels for which the first and second bitmap values are summed further includes pels on one or more lines above a line containing the given pel and one or more lines below the line containing the given pel.

* * * * *